United States Patent
Paulsen et al.

(10) Patent No.: US 11,211,695 B1
(45) Date of Patent: Dec. 28, 2021

(54) DUAL BEAM TRANSMIT SYSTEM FOR ANALOG BEAMFORMING AIRBORNE SATELLITE COMMUNICATIONS

(71) Applicant: Rockwell Collins, Inc., Cedar Rapids, IA (US)

(72) Inventors: Lee M. Paulsen, Cedar Rapids, IA (US); Nahiyan Ali, Des Plaines, IL (US); Jaber A. Khoja, San Diego, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 168 days.

(21) Appl. No.: 16/129,213

(22) Filed: Sep. 12, 2018

(51) Int. Cl.
*H01Q 1/28* (2006.01)
*H01Q 21/24* (2006.01)
*H04B 7/0408* (2017.01)
*H04B 7/06* (2006.01)

(52) U.S. Cl.
CPC ............. *H01Q 1/288* (2013.01); *H01Q 21/24* (2013.01); *H04B 7/0408* (2013.01); *H04B 7/0617* (2013.01)

(58) Field of Classification Search
CPC .... H04B 7/0408; H04B 7/0617; H01Q 1/288; H01Q 21/24
See application file for complete search history.

(56) References Cited

U.S. PATENT DOCUMENTS

| | | | |
|---|---|---|---|
| 8,736,504 B1 | 5/2014 | West et al. | |
| 9,455,500 B1 | 9/2016 | West et al. | |
| 9,647,748 B1 | 5/2017 | Mitchell | |
| 9,705,611 B1* | 7/2017 | West | H04B 17/21 |
| 9,716,309 B1 | 7/2017 | Elsallal | |
| 9,843,107 B2 | 12/2017 | Corman et al. | |
| 9,848,370 B1 | 12/2017 | Freedman et al. | |
| 2012/0326925 A1* | 12/2012 | Chang | H01Q 3/267 342/357.59 |
| 2018/0337722 A1* | 11/2018 | Paulsen | H01Q 21/061 |

OTHER PUBLICATIONS

Non-Final Office Action for U.S. Appl. No. 15/600,497 dated Apr. 25, 2018. 9 pages.
U.S. Appl. No. 15/403,134, filed Jan. 10, 2017, Campbell, et al.
U.S. Appl. No. 15/413,052, filed Jan. 23, 2017, West, James B.
U.S. Appl. No. 15/600,497, filed Mar. 19, 2017, Paulsen et al.

* cited by examiner

*Primary Examiner* — Dao L Phan
(74) *Attorney, Agent, or Firm* — Suiter Swantz pc llo

(57) ABSTRACT

A satellite communication assembly includes a transmit antenna array including a matrix of antenna elements, a receive antenna array, and a transmit circuit for the transmit antenna array. The transmit circuit includes, for each of the antenna elements, a first splitter, a second splitter, a first pair of phase shifters, a second pair of phase shifters, a first pair of variable gain amplifiers, a second pair of variable gain amplifiers, a first pair of power amplifiers, a second pair of power amplifiers, a first combiner, and a second combiner.

12 Claims, 15 Drawing Sheets

DUAL BEAM TRANSMIT SYSTEM FOR ANALOG BEAMFORMING AIRBORNE SATELLITE COMMUNICATIONS

CROSS-REFERENCE TO RELATED PATENT APPLICATIONS

This application is related to U.S. application Ser. No. 15/600,497 filed on Mar. 19, 2017, U.S. patent application Ser. No. 15/403,134 filed on Jan. 10, 2017 and U.S. application Ser. No. 15/413,052 filed on Jan. 23, 2017, all of which are assigned to the assignee of the present application, and incorporated herein by reference in their entireties.

BACKGROUND

The present disclosure relates generally to the field of satellite communication. More specifically, the present disclosure relates to airborne satellite communication.

Satellite communication systems are able to provide up to a limit of peak data (e.g., 400 Mbps peak data in certain conventional systems) to an airplane using a constellation of low earth orbit (LEO) satellites. The peak data limit is often less than required or desired by customers. Demand for data on airplanes (e.g., high speed internet connections) is continually increasing which increases the need for higher peak data limits. Increasing the peak data limits and data bandwidth available on airplanes is challenging using conventional systems.

SUMMARY

In one aspect, embodiments of the inventive concepts disclosed herein are directed to a dual beam transmit system for analog beamforming airborne satellite communications. The dual beam transmit system includes an antenna array comprising antenna elements, a first port, a second port, a first variable gain amplifier, and a second variable gain amplifier. The first variable gain amplifier is coupled to the first port, and the second variable gain amplifier is coupled to the second port. The system also includes a controller configured to adjust gain of the first variable gain amplifier or the second variable gain amplifier to reduce intermodulation in accordance with network management for transmission of a first signal received at the first port and a second signal provided to the second port.

In a further aspect, embodiments of the inventive concepts disclosed herein are directed to a satellite communication assembly for an aircraft. The satellite communication assembly includes a transmit antenna array comprising a matrix of antenna elements, a receive antenna array, and a transmit circuit for the transmit antenna array. The transmit circuit includes for each of the antenna elements a first splitter coupled to receive a first signal for a first type satellite, a second splitter coupled to receive a second signal for a second type satellite, a first pair of phase shifters coupled to the first splitter, a second pair of phase shifters coupled to the second splitter, a first pair of variable gain amplifiers coupled to the first pair of the phase shifters, and a second pair of variable gain amplifiers coupled to the second pair of the phase shifters.

In a further aspect, embodiments of the inventive concepts disclosed herein are directed to a method of providing two beams from a transmit antenna array onboard a vehicle. The method includes analog beamforming a first beam for a first type satellite using a first signal provided to a first port of the transmit antenna array, and analog beamforming a second beam for a second type satellite using a second signal provided to a second port of the transmit antenna array. Equivalent isotropically radiated power of the first beam or the second beam is controlled in accordance with network management to reduce intermodulation.

BRIEF DESCRIPTION OF THE DRAWINGS

Implementations of the inventive concepts disclosed herein may be better understood when consideration is given to the following detailed description thereof. Such description makes reference to the appended drawings, which are not necessarily to scale, and in which some features may be exaggerated and some features may be omitted or may be represented schematically in the interest of clarity. Like reference numerals in the figures may represent and refer to the same or similar element, feature, or function. In the drawings.

DETAILED DESCRIPTION

Figure 1:
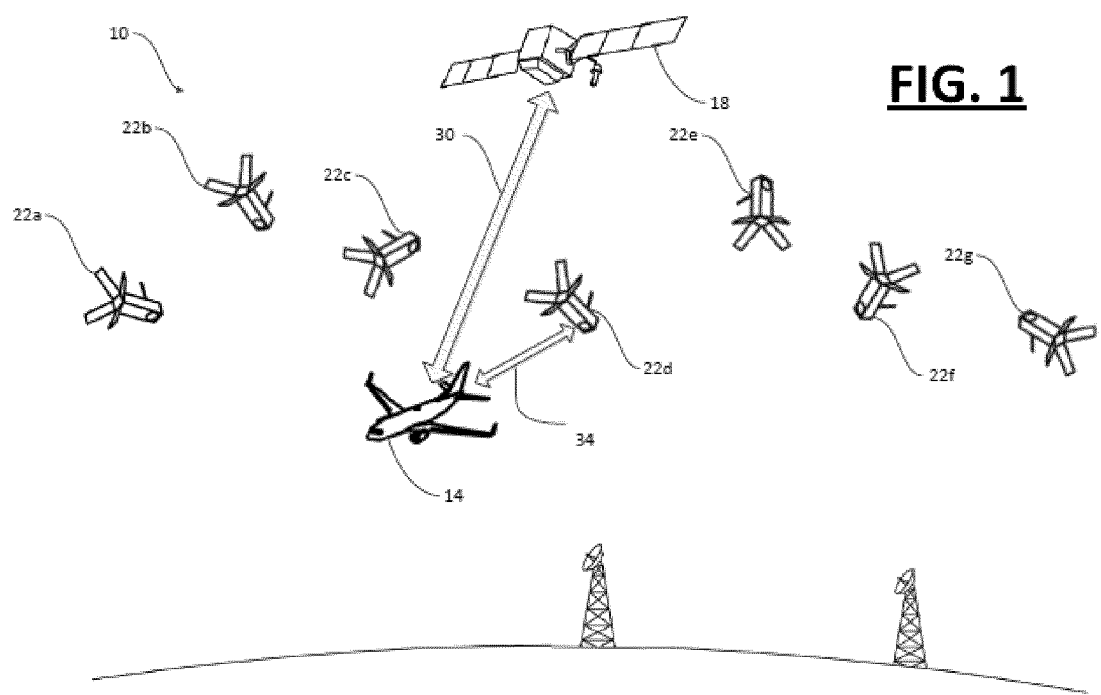
FIG. 1 is a perspective view schematic drawing of a satellite based aviation communication network in communication with an aircraft according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods provide increased gross data capacity and multi-mode operation according to certain exemplary aspects of the inventive concepts described herein. Multi-mode operation can be used to support data links (e.g., airplane navigation and communication systems, internet access for passengers) and internet protocol television (IPTV). In some embodiments, the systems and methods provide interoperability between low Earth orbiting (LEO) satellites, medium Earth orbiting (MEO) satellites, and/or geostationary or geosynchronous Earth orbiting (GEO) satellites and leverage their use to meet the usage demand (peak data) requirements. Airborne satellite communication systems can communicate with two or more of LEO satellites, MEO satellites, and/or GEO satellites.

In some embodiments, a dual beam, receive and transmit, active phased array antenna system is used to establish two independent satellite links. The dual beam, receive and transmit, active phased array antenna system utilizes analog beam forming to establish the two independent analog beams for both reception and transmission and are provided in a single mountable system platform housing one antenna array for transmit (Tx) operations and one antenna array for receive (Rx) in some embodiments.

In some embodiments, the systems and methods use a single low noise amplifier (LNA) and antenna in the receive path and split the received signals to add independent phase weights for two separate beams for two independent modems. In some embodiments, the systems and methods maintain a certain equivalent isotropically radiated power (EIRP) for transmit operations without requiring independent power amplifiers (PAs) and antennas. The EIRP levels of each independent beam are controlled through variable gain amplifiers coupled to each antenna element in accordance with network management in some embodiments. The systems and method achieve reduced size and lower power consumption for dual independent transmit beams that enable dual full duplex functionality simultaneously in some embodiments, thereby reducing size, weight and power (SWAP).

With reference to FIG. 1, an environment 10 includes an aircraft 14, a GEO satellite 18, and LEO satellites 22$a$-$g$. The LEO satellites 22$a$-$g$ and/or the GEO satellite 18 are MEO satellites in some embodiments. The aircraft 14 communicates with the GEO satellite 18 which is part of a GEO satellite network or constellation via a beam 30. In some embodiments, the GEO satellite 18 can communicate with one or more medium earth orbit (MEO) satellites. The aircraft 14 also communicates with the LEO satellite 22$d$ of the LEO satellites 22$a$-$g$ which are part of a LEO satellite network or constellation via a beam 34. The beams 30 and 34 are transmit and/or receive beams in some embodiments. In some embodiments, the double arrow line associated with the beam 30 in FIG. 1 represents a separate transmit beam and receive beam between the aircraft 14 and the GEO satellite 18. In some embodiments, the double arrow line associated with the beam 34 in FIG. 1 represents a separate transmit beam and receive beam between the aircraft 14 and the LEO satellite 22$d$.

A satellite constellation as used herein refers to two or more satellites (which may or may not be operated by different owners and operators) arranged in one or more networks or one or more orbital types. In some embodiments, the aircraft 14 could communicate with two or more satellites, two or more from the same constellation or each from different constellations. In some embodiments, the GEO satellite 18 and the LEO satellite 22$d$ are in communication with one or more ground stations.

Advantageously, the aircraft 14 is capable of simultaneously or near simultaneously communicating with more than one satellite constellation. For example, the aircraft 14 communicates via the beams 30, 34 with the GEO satellite 18 and the LEO satellite 22$d$. In some embodiments, aircraft 14 can simultaneously communicate with two or more satellites, with a ground station when within range, and/or with two or more satellite constellations or satellite types.

Figure 2:
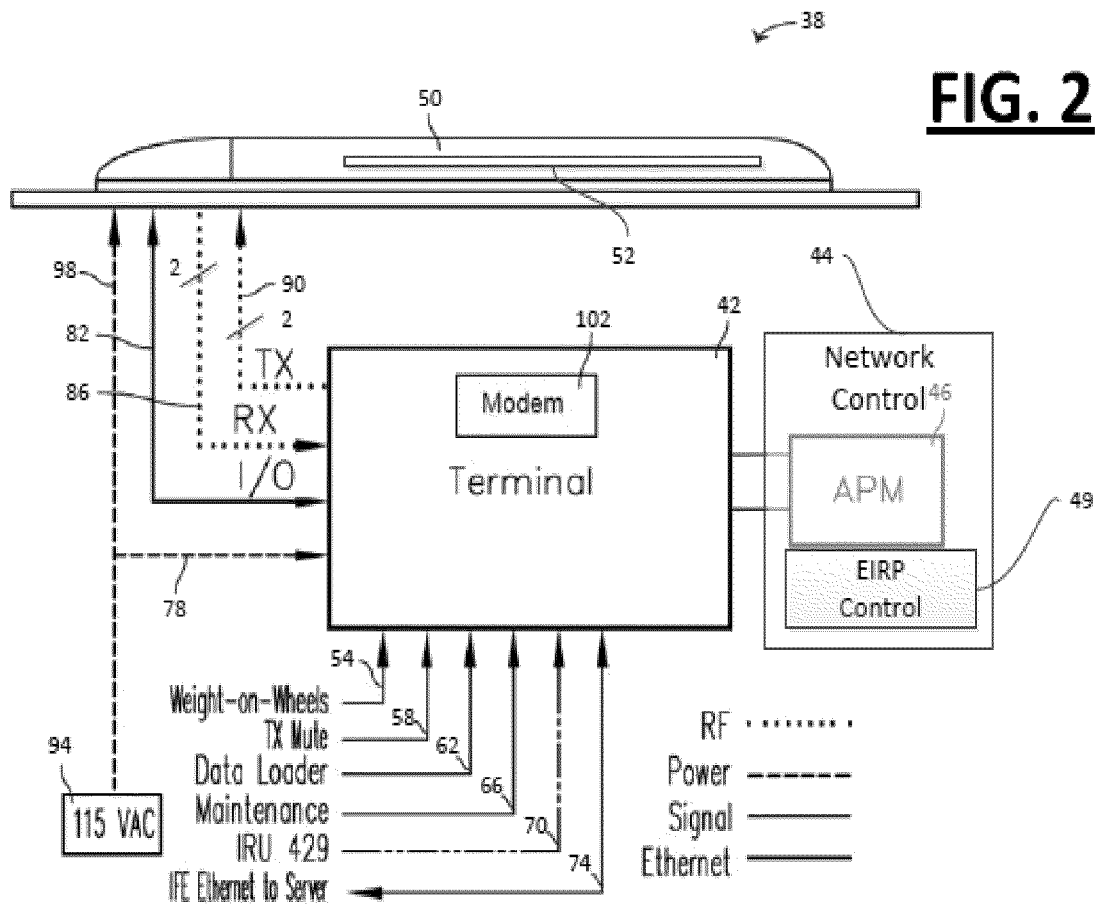
FIG. 2 is a planar side view schematic drawing of a satellite communication system including a terminal (shown in block diagram form) and a phased array antenna assembly for use in the satellite based aviation communication network illustrated in FIG. 1 according to exemplary aspects of the inventive concepts disclosed herein.

With reference to FIG. 2, the aircraft 14 (FIG. 1) is equipped with a satellite communication system 38 including a terminal 42, a network controller 44, and an antenna assembly 50. The network controller 44 includes an aircraft personality module (APM) 46 and an EIRP control circuit 49, and the antenna assembly 50 includes an antenna system 52. The terminal 42 receives a weight on wheels signal at an input 54, a transmit mute signal at an input 58, a data loader at an input 62, a maintenance signal at an input 66, inertial reference unit (IRU) 429 signals at a bus input 70 and Ethernet signals at a input bus 74. Alternative other inputs and outputs can be provided to terminal 42. The inputs 54, 58, 62, 66, 70, 74 can be coupled with various types of equipment on the aircraft 14 and line replaceable units. The inputs 54, 58, 62, 66, 70, 74 are input/output terminals capable of bi-directional communication in some embodiments. The terminal 42 responds to the various signals on the inputs 54, 58, 62, 66, 70, 74 for enabling communications and maintenance of the satellite communication system 38.

The network controller 44 controls the EIRP of transmit signals provided on a dual signal line 90 to the antenna system 52. The transmit signals are associated with the beams 30 and 34 in some embodiments. In some embodiments, the network controller 44 uses network management principles to select EIRP levels for the transmit signals so that intermodulation components due to the provision of the transmit signals on the dual signal line 90 do not exceed regulatory standards, such as, the Federal Communication Committee (FCC) or other regulatory body. In some embodiments, the network controller 44 via the EIRP control circuit 49 individually controls the EIRP levels via gain circuitry to provide the most throughput using both beams 30 and 34 simultaneously without exceeding limits on intermodulation products.

Advantageously, the network controller 44 lowers the energy of intermodulation products to provide the beams 30 and 34 with minimal impact on power consumption. Network management ensures the intermodulation products are within the allocated band and low enough to not interfere with other satellites. The network controller 44 provides satellite prioritization based on capacity availability determined by network management. For example, if the LEO satellite 28d is being used at high capacity (e.g., due to many users) and the GEO satellite 18 is being used at low capacity, the network management can prioritize GEO beam (e.g., the beam 30 in FIG. 1) to be at maximum EIRP for higher throughput and reduce the LEO EIRP low enough (e.g., of the beam 34 in FIG. 1) to keep both links established. In another example, if the GEO satellite 18 is at high capacity and the LEO satellite 28d is at low capacity at any given time, the network controller 44 makes the EIRP changes accordingly to direct higher EIRP levels to the LEO satellite 24d and reduce the EIRP levels for the GEO satellite 18. In another example, if the LEO satellite 28d has high traffic (e.g., due to many users) and the GEO satellite 18 has low traffic, the network management can prioritize LEO beam to be at maximum EIRP for higher throughput and reduce the GEO EIRP low enough to maintain the low traffic and yet keep both links established. In another example, if the GEO satellite 18 has high traffic and the LEO satellite 28d has low traffic at any given time, the network controller 44 makes the EIRP changes accordingly to direct higher EIRP levels to the GEO satellite 18 and reduce the EIRP levels for the LEO satellite 28d. In some embodiments, if the LEO satellite 28d is being used at high capacity (e.g., due to many users) and the GEO satellite 18 is being used at low capacity, the network management can prioritize GEO beam to be at maximum EIRP for higher throughput and redirect traffic to the GEO satellite 18 and reduce the LEO EIRP low enough to keep both links established. In some embodiments, the network controller 44 directs traffic to other satellites 28a-c or 28e-g with low traffic to maximize throughput for the user.

The network controller 44 determines the power levels of intermodulation products power level based upon necessary range or power levels, frequencies and pointing angles of the beams 30 and 34. A look up table can be used to determine the intermodulation products power levels based upon these factors. In some embodiments, calculations are utilized used to determine the intermodulation products power levels. The range and pointing angles can be determined from ephemeris satellite data and position systems on board the aircraft 14 or associated with the antenna assembly 50. If the intermodulation products power levels are too great, lower power levels are selected to provide the beams 30 and 34 with appropriate power levels for the intermodulation products. In some embodiments, different pointing angles, ranges, or frequencies are chosen to reduce the power levels of intermodulation products that are too high. In some embodiments, the power levels of one or both beams are reduced an amount that allows the links to remain established, although at lower data rates.

In some embodiments, the network controller 44 is located inside the aircraft 14. The network controller 44 includes a processer and memory for selecting levels of reductions (e.g., in EIRP). The memory can store non-transitory software instructions for implementing the reductions as described herein according to some embodiments.

The APM 46 stores configuration data and can be used with a network interface controller for the aircraft 14. The APM 46 includes a SIM card for storing information for the terminal 42. The APM 46 provides identification information for the terminal 42 and the modem(s) inside the terminal 42. In some embodiments, the terminal 42 is replaceable without replacing the APM 46.

The terminal 42 is powered via a power input 78. An input/output (I/O) bus 82 is also coupled to the terminal 42 and the antenna assembly 50. The I/O bus 82 allows control and data signals to be communicated between the terminal 42 and the antenna assembly 50. A receive line 86 (e.g., a dual line) is coupled between the terminal 42 and the antenna assembly 50 for radio frequency (RF) receives signals and the dual signal line 90 is coupled between the terminal 42 and the antenna assembly 50 for RF transmit signals. The RF signals are intermediate frequency (IF) signals or baseband signals in some embodiments. A power source 94 provides power to the terminal 42 via the power input 78 and to the antenna assembly 50 via an input 98. The terminal 42 includes a modem circuit 102. The modem circuit 102 provides modulation and demodulation operations for the satellite communication system 38.

The antenna assembly 50 is disposed on the aircraft 14 at various locations. The antenna assembly 50 is disposed outside of the fuselage of the aircraft 14 for transmitting and receiving RF signals to and from satellite networks in some embodiments. In some embodiments, the antenna assembly 50 is disposed on a top portion of the aircraft 14. In some embodiments, the antenna assembly 50 contains an antenna system 52 configured as a pair of dual beam active electronically scanned array (AESA) antenna arrays (one array for two receive beams and one array for two transmit beams) that is installed on an outside skin of the aircraft 14 (FIG. 1).

In some embodiments, the antenna assembly 50 includes an inertial measurement unit, one or more global navigation satellite system (GNSS) receivers, and a power supply. The GNSS receivers and communicate with GNSS satellites to determine positioning for the satellite communication system 38. The use of two GNSS receivers allows differential positioning to be utilized for more accurate position determination including heading and tilt determinations for the antenna assembly. The positioning determinations are augmented using the inertial measurement unit in some embodiments. The inertial measurement unit is separate from the inertial reference system of the aircraft 14.

In some embodiments, the satellite communication system 38 is configured for element level multi-beam formation. The element level multi-beam formation provides multiple beamforming signal paths to synthesize beams toward multiple satellites with a wide angular separation. In some embodiments, the satellite communication system 38 is configured for subarray beamforming that supports a wide frequency operation on a single satellite (e.g. IPTV & Data) by implementing a second-level multi-beam beam former at a subarray level. In some embodiments, a single user on the aircraft 14 receives a first non-zero portion of a data from one network using the beam 30 and a second non-zero portion of the data from another network using the beam 34.

Figure 3:
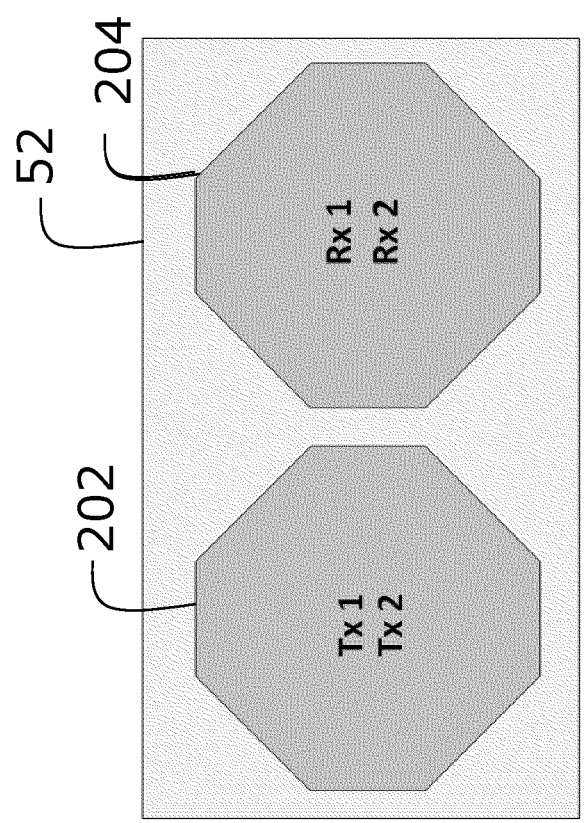
FIG. 3 is a planar top view schematic drawing of an antenna system for the satellite communication system illustrated in FIG. 2 according to exemplary aspects of the inventive concepts disclosed herein.

With reference to FIG. 3, the antenna system 52 includes a transmit (Tx) antenna array 202 and a receive (Rx) antenna array 204 each supporting dual analog beam forming operations. In some embodiments, the antenna system 52 includes additional RX and TX arrays. In some embodiments, the transmit antenna array 202 and the receive antenna array 204 are dual polarization AESA antenna arrays with variable gain circuitry so the network controller 44 can control the EIRP levels using network management. In some embodiments, the transmit antenna array 202 and the receive antenna array 20 are circuit board-based ASEA antenna arrays. In some embodiments, the configuration of the transmit (Tx) antenna array 202 and the receive (Rx) antenna array 204 provide sufficient aperture and redundancy to maintain high quality performance with two or more of LEO, MEO, and/or GEO based satellite networks.

Figure 4:
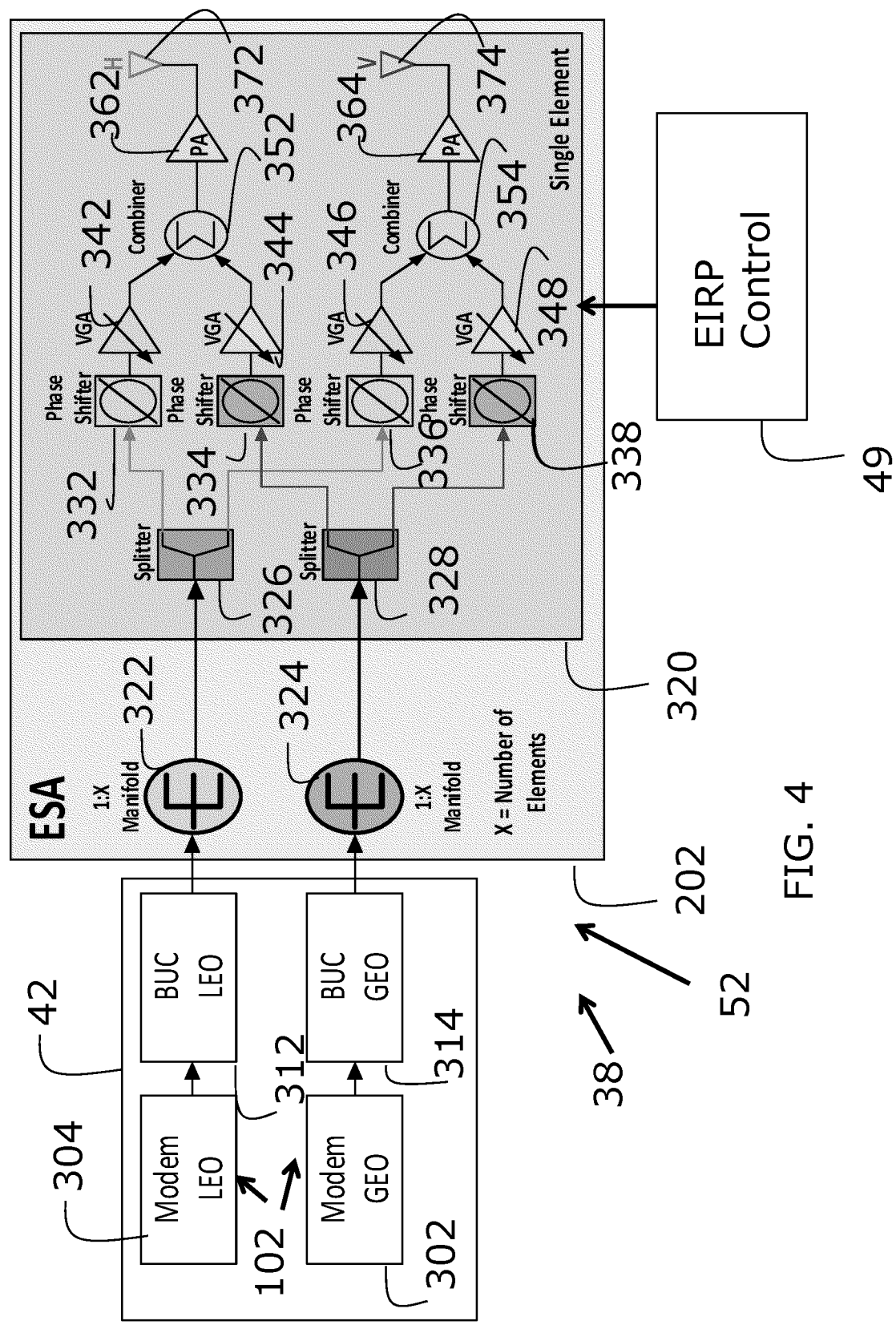
FIG. 4 is a schematic more detailed block diagram of the satellite communication system illustrated in FIG. 2 with two power amplifiers per a pair of polarization elements according to exemplary aspects of the inventive concepts disclosed herein.

With reference to FIG. 4, the satellite communication system 38 includes the terminal 42 and the antenna system 52. The terminal 42 includes a LEO block up converter 312, a GEO block up converter 314, and the modem circuit 102 including a LEO modem 302 and a GEO modem 304. The antenna system 52 includes a manifold circuit 322, a manifold circuit 324 and a matrix of antenna element circuits such as an antenna element circuit 320. The antenna element circuit 320 is part of the transmit antenna array 202 in some embodiments. Only antenna element circuit 320 is described for simplicity. The antenna system 52 can include a large number of antenna elements circuits.

The antenna element circuit 320 includes a splitter 326, a splitter 328, a phase shifter 332, a phase shifter 334, a phase shifter 336, and a phase shifter 338, a variable gain amplifier (VGA) 342, a VGA 344, a VGA 346, a VGA 348, a combiner 352, a combiner 354, a power amplifier 362, a power amplifier 364, a polarization or antenna element 372, and a polarization or antenna element 374. In some embodiments, the antenna elements 372 and 374 are horizontal and vertical polarization elements, respectively. Other types of antenna elements can be utilized. In some embodiments, only a single antenna element 372 or 374 (e.g., polarized or non-polarized) is included with the antenna element circuit 320.

In some embodiments, the satellite communication system is configure to achieve an EIRP of 48 decibel Watts (dBW) in the Ku band for the GEO satellite 18 using 2025 elements for the transmit antenna array 202 with each transmitting at +7.5 dB miliWatts of output power. The power amplification per element is 20 dB in some embodiments. The elements are spaced apart at wavelength/2 at 14.5 GHz, which puts the total spatial gain at between 70.4 and 71.1 dB in some embodiments. In some embodiments, an EIRP level of 48 dBW or 78 dB milliwatts (dBm) is provided for the beam 30 to the GEO satellite 18. In some embodiments, an EIRP level of 33.6 dBW or 73.6 dBm is provided for the beam 34 to the LEO satellite 22d.

An RF transmit signal for a beam (e.g., a beam 34 to the LEO satellite 28d in FIG. 1) is provided from the LEO block up converter 312 to the manifold circuit 322 via a first port. The RF signal from the block converter 312 is a modulated signal having modulated data provided by the LEO modem 302. The RF transmit signal from the LEO block up converter 312 is provided in a frequency range associated with the LEO satellite 28d. An RF transmit signal for a beam (e.g., the beam 30 to the GEO satellite 18 in FIG. 1) is provided from the GEO block up converter 314 to the manifold circuit 324 via a second port. The RF signal from the block converter 314 is a modulated signal having modulated data provided by the GEO modem 304. The RF transmit signal from the block up converter 314 is provided in a frequency range associated with the GEO satellite 18. The RF signals from the block up converters 312 and 314 are simultaneously provided in some embodiments.

The manifold circuits 322 and 324 provide the RF signals to each antenna element circuit in the transmit antenna array 202 in some embodiments. The RF signal from the manifold circuits 322 and 324 are respectively received by the splitters 326 and 328 in the antenna element circuits. Each of the splitters 326 and 328 splits each RF signal and provides a pair of signals to a signal path for the antenna element 372 and a signal path for the antenna element 374. A phase shifter 332 receives the RF signal derived from signal from the LEO block up converter 312 via the splitter 326, and a phase shifter 334 receives the RF signal derived from signal from the GEO block up converter 314 via the splitter 328. A phase shifter 336 receives the RF signal derived from signal from the LEO block up converter 312 via the splitter 326, and a phase shifter 338 receives the RF signal derived from signal from the GEO block up converter 314 via the splitter 328. VGAs 342, 344, 346, and 348 are respectively coupled to the phase shifters 332, 334, 336, and 338.

The VGAs 342 and 344 provide respective RF signals derived from the LEO modem 302 and the GEO modem 304 to the power amplifier 362 via the combiner 352 for provision to the antenna element 372. The VGAs 342 and 348 provide respective RF signals derived from the LEO modem 302 and the GEO modem 304 to the power amplifier 364 via the combiner 354 for provision to the antenna element 374. The application of the RF signals to the power amplifiers 362 and 364 creates intermodulation products.

The VGAs 342, 344, 346, and 348 are coupled to the EIRP control circuit 49 to receive a gain control signal to reduce intermodulation in some embodiments. In some embodiments, the VGAs 342 and 346 and the VGAs 344 and 348 are controlled to minimize or reduce intermodulation in space by lowering EIRP (e.g., from 1 to 4 dB depending upon network management). In some embodiments, the gain levels are controlled to maintain and/or establish links for the beams 30 and 34 (FIG. 1) although at reduced throughput in some instances.

The phase shifters 332, 334, 336, and 338 are analog vector phase shifters in some embodiments. The VGAs 342, 344, 346, and 348 are RF differential amplifiers with controllable gains in some embodiments. The phase shifters 332, 334, 336, and 338 and the VGAs 342, 344, 346, and 348 are controlled to provide analog beam forming in some embodiments. The power amplifiers 362 and 364 are RF power amplifiers in some embodiments. The use of a single power amplifier 362 and 364 for the antenna elements 372 and 374 reduces costs and power requirements in some embodiments.

Figure 5:
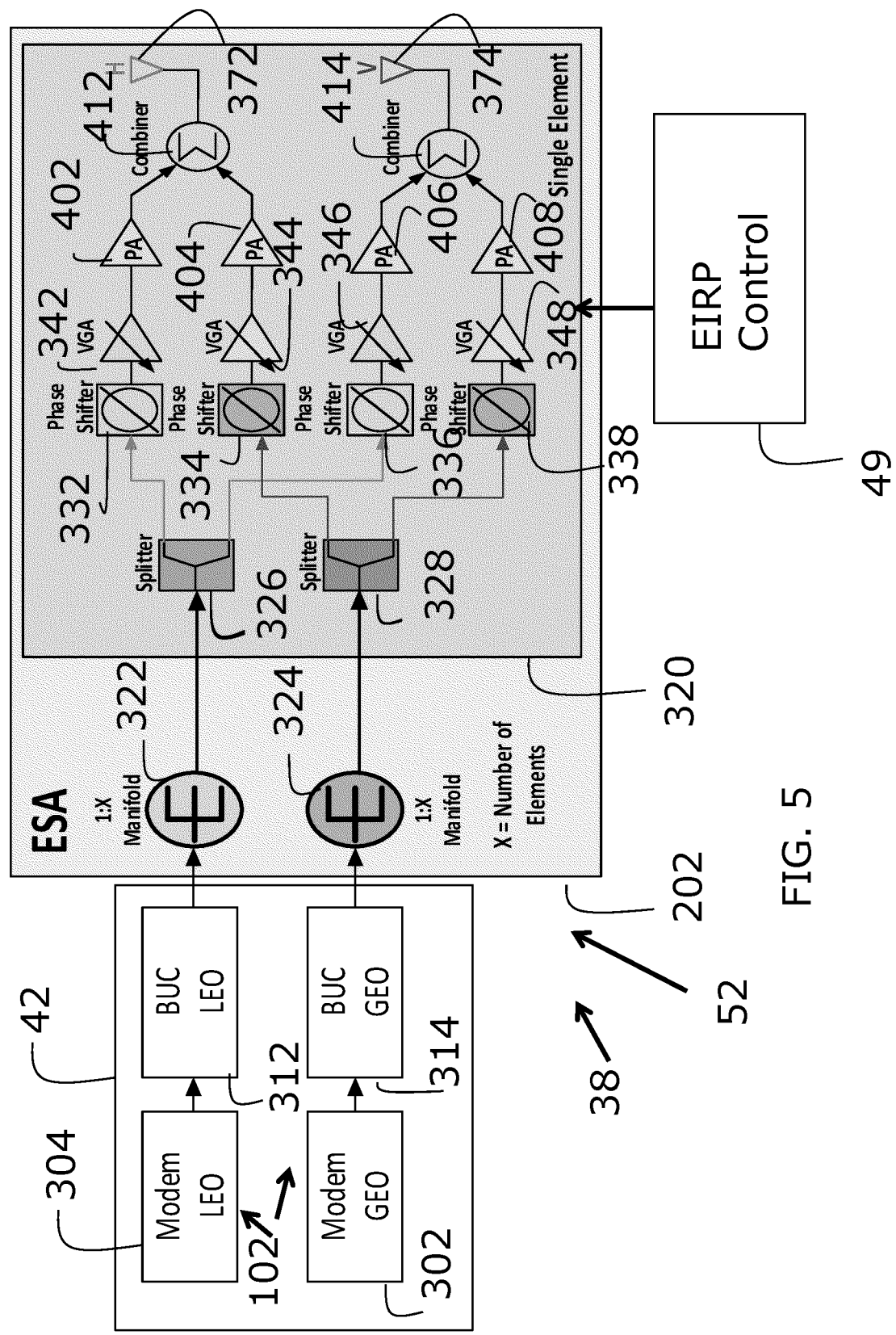
FIG. 5 is a schematic more detailed block diagram of the satellite communication system illustrated in FIG. 2 with four power amplifiers per a pair of polarization elements according to exemplary aspects of the inventive concepts disclosed herein

With reference to FIG. 5, the satellite communication system 38 includes the terminal 42 and the antenna system 52. The terminal 42 includes a LEO block up converter 312, a GEO block up converter 314, and the modem circuit 102 including a LEO modem 302 and a GEO modem 304. The antenna system 52 includes a manifold circuit 322, a manifold circuit 324 and a matrix of antenna element circuits such as antenna element circuit 520 which is similar to the antenna element circuit 320 (FIG. 3). The antenna element circuit 520 is part of the transmit antenna array 202 in some embodiments. Only antenna element circuit 520 is described for simplicity. The antenna element circuit 520 includes four power amplifiers 402, 404, 406, and 408 having inputs respectively coupled to the VGAs 342, 344, 346, and 348. The outputs of the power amplifiers 402, and 404 are coupled to a combiner 412 and the outputs of the power amplifiers 406 and 408 are coupled to a combiner 414. The use of four power amplifiers 402, 404, 406, and 408 and combiners 412 and 414 provides better isolation and reduces intermodulation as compared to the intermodulation of the antenna element circuit 220. Due to combiner loss, the four power amplifiers 402, 404, 406, and 408 have higher linearity (e.g., greater than 10 db). With such an architecture, transmission at maximum EIRP can be utilized without reductions using the VGAs 342, 344, 346, and 348 according to network management in some embodiments.

Figure 6:
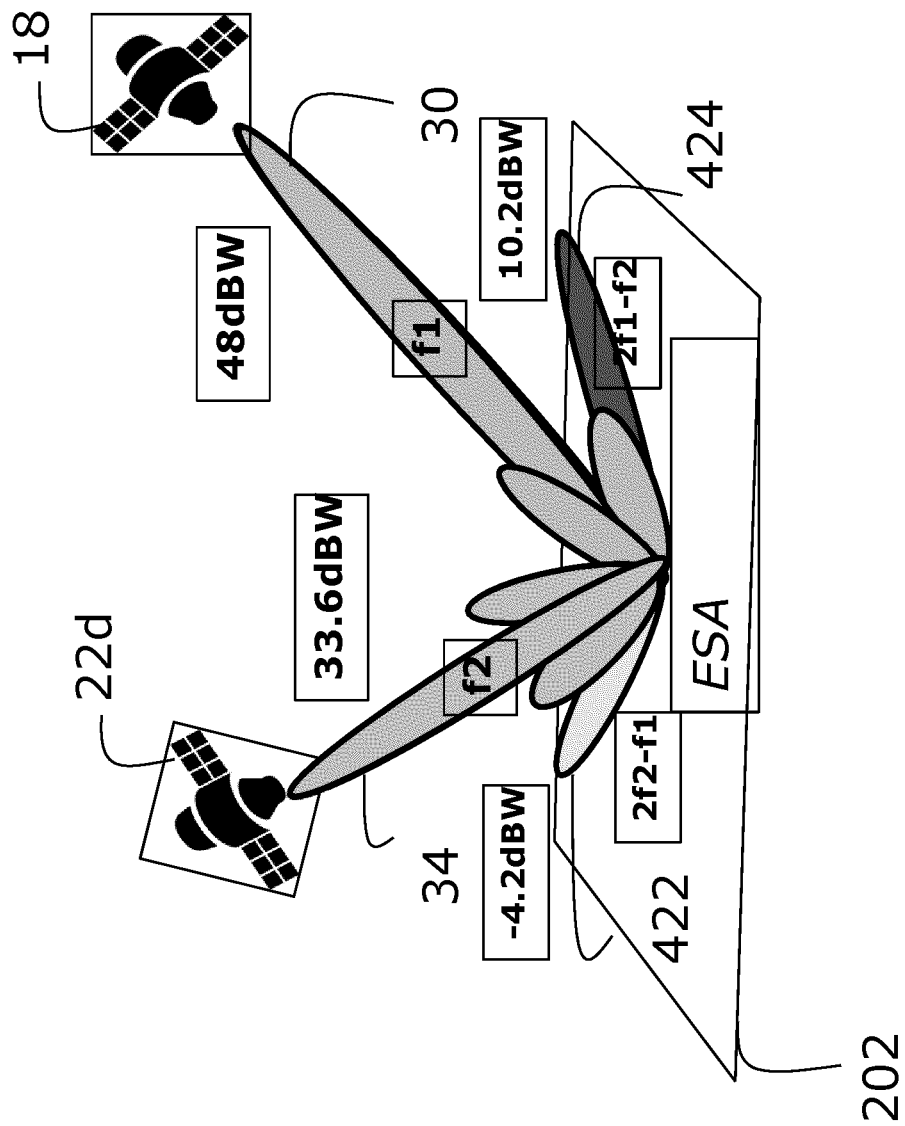
FIG. 6 is a schematic drawing of beams provided by the antenna system illustrated in FIG. 3 at maximum EIRP according to exemplary aspects of the inventive concepts disclosed herein.
Figure 7:
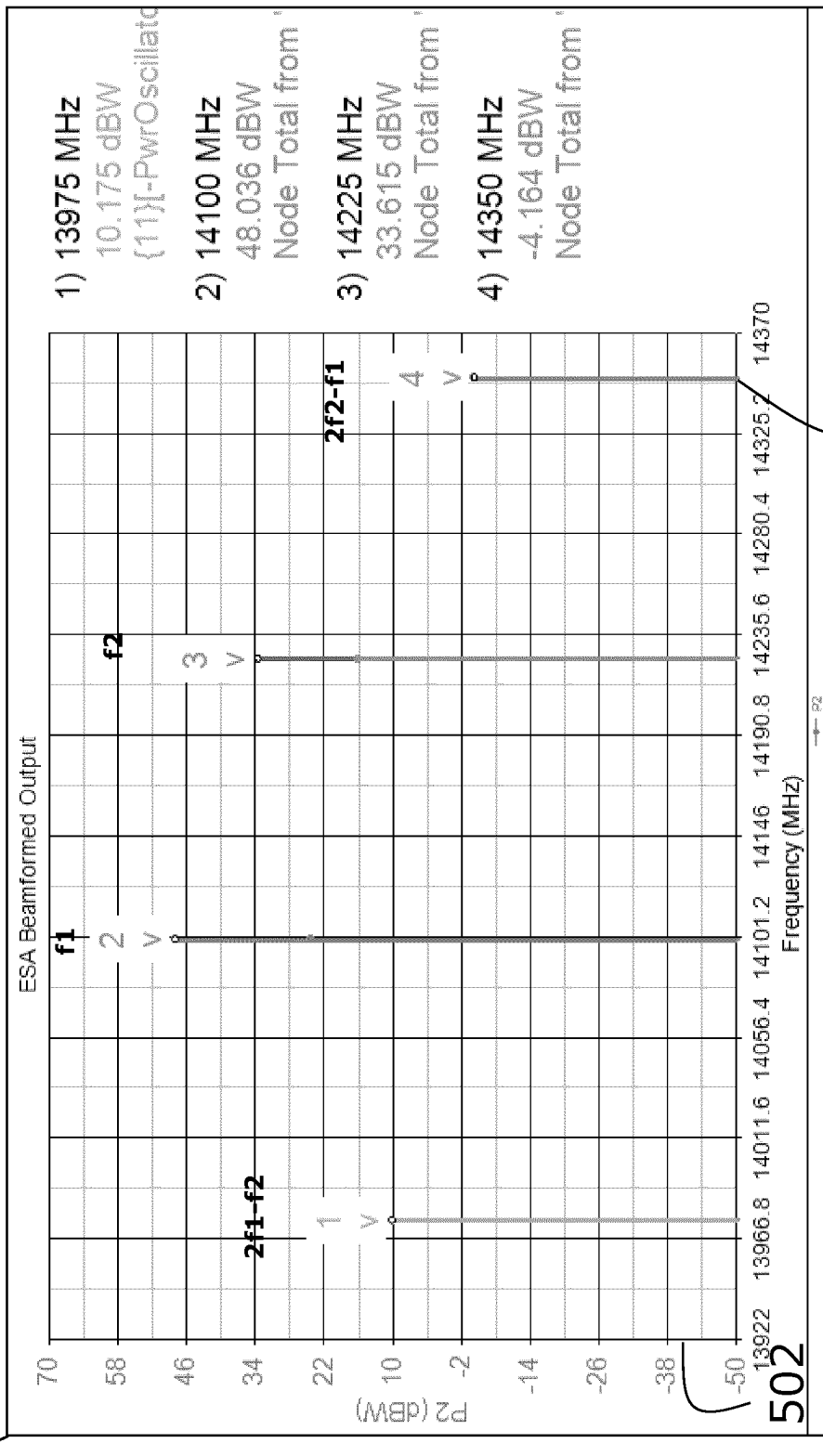
FIG. 7 is a graph showing beamformer output for the beams illustrated in FIG. 6 according to exemplary aspects of the inventive concepts disclosed herein

With reference to FIG. 6, the provision of the beam 30 at a frequency $f_1$ and the beam 34 at a frequency $f_2$ from the transmit antenna array 202 provides an intermodulation product 422 at a frequency $2f_2-f_1$ and an intermodulation product 424 at a frequency $2f_1-f_2$ for the satellite communication system 38. The frequencies $f_2$ and $f_1$ are equal to 14.225 GHz and 14.101 GHZ, respectively, and are provided at power levels of 33.6 dBW and 48.8 dBW, respectively, in some embodiments. The intermodulation products 422 and 424 have a power level of −4.2 dBW and 10.2 dBW in some embodiments. With reference to FIG. 7, a chart 500 includes a Y-axis 502 corresponding to power in dBW and an X-axis 504 corresponding to frequency. The chart 500 shows the power levels associated with the beams 30 and 34 and the intermodulation products 424 and 422 in dBW. At maximum EIRP, the intermodulation products 422 and 424 are 37.8dbW below the power levels associated with the beams 30 and 34, respectively, in some embodiments.

Figure 8:
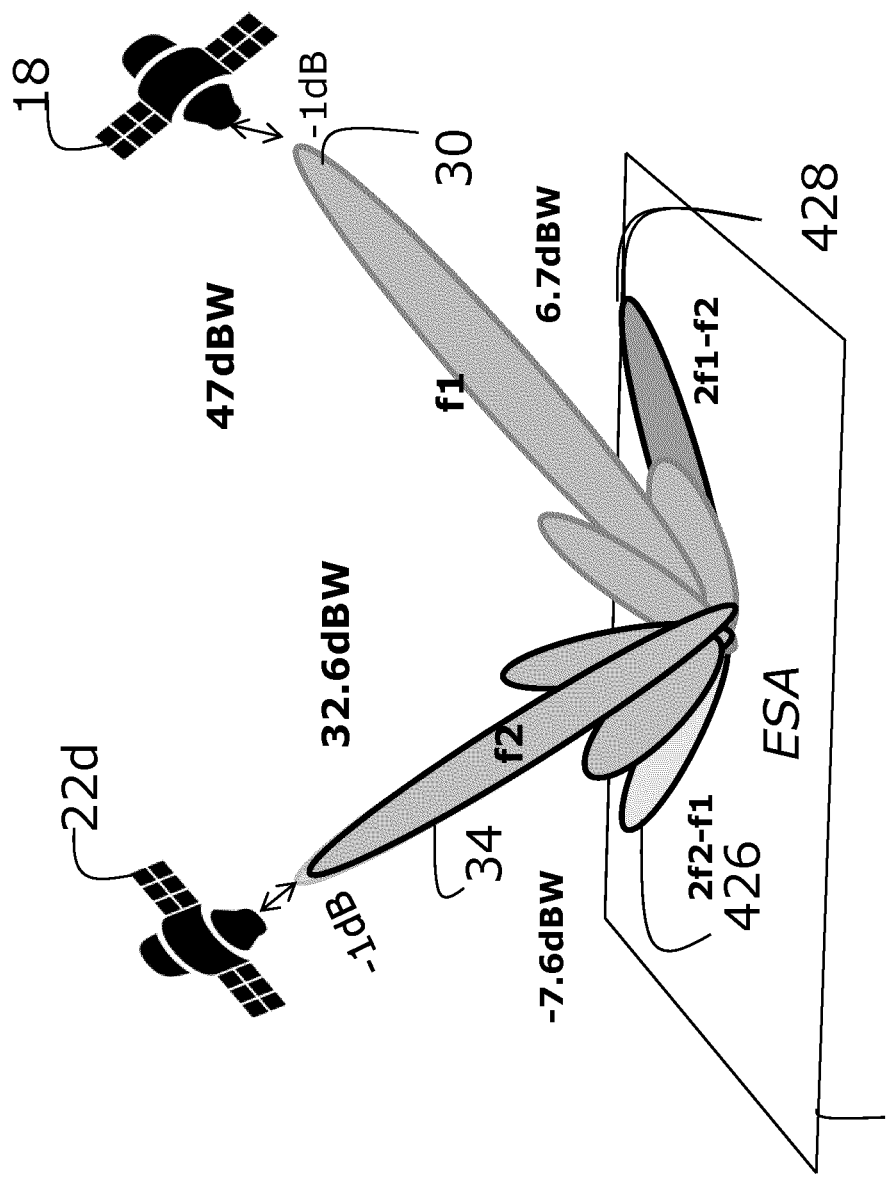
FIG. 8 is a schematic drawing of beams provided by the antenna system illustrated in FIG. 3 at maximum EIRP minus one decibel (dB) according to exemplary aspects of the inventive concepts disclosed herein.
Figure 9:
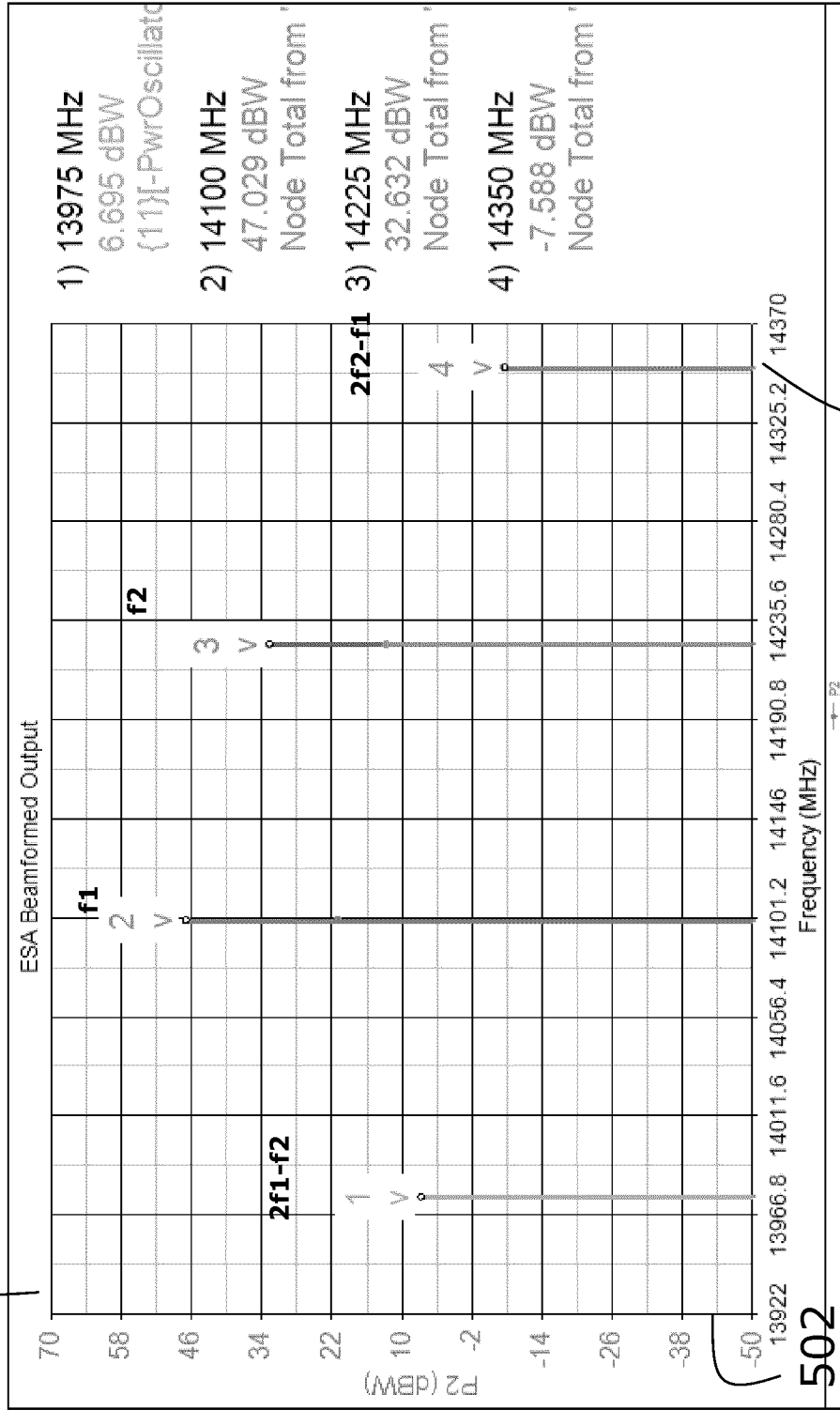
FIG. 9 is a graph showing beamformer output for the beams illustrated in FIG. 8 according to exemplary aspects of the inventive concepts disclosed herein.

With reference to FIG. 8, the provision of the beam 30 at a frequency $f_1$ and the beam 34 at a frequency $f_2$ from the transmit antenna array 202 provides an intermodulation product 426 at a frequency $2f_2-f_1$ and an intermodulation product 428 at a frequency $2f_1-f_2$ for the satellite communication system 38. The frequencies $f_2$ and $f_1$ are equal to 14.225 GHz and 14.101 GHZ and are provided at power levels of 33.6 dBW and 46.9 dBW in some embodiments. The intermodulation products 426 and 428 have a power level of −7.2 dBW and 6.7 dBW in some embodiments. With reference to FIG. 9, a chart 600 includes the Y-axis 502 corresponding to power in dBW and the X-axis 504 corresponding to frequency. The chart 600 shows the power levels associated with the beams 30 and 34 and the intermodulation products 428 and 426 in dBW. At maximum EIRP minus 1 dBW, the intermodulation products 426 and 428 are 40.2dbW below the power levels associated with the beams 30 and 34, respectively, in some embodiments. The reduction in EIRP is provided by the VGAs 342, 344, 346, and 348 in response to the EIRP control circuit 49 (FIG. 4). Since the close in intermodulation beam products (products 426 and 428) are 3rd order, a 3:1 growth or decay relative to the output power is provided. If the output EIPR drops by 1 dB, the intermodulation products drop by 3 dB in some embodiments.

Figure 10:
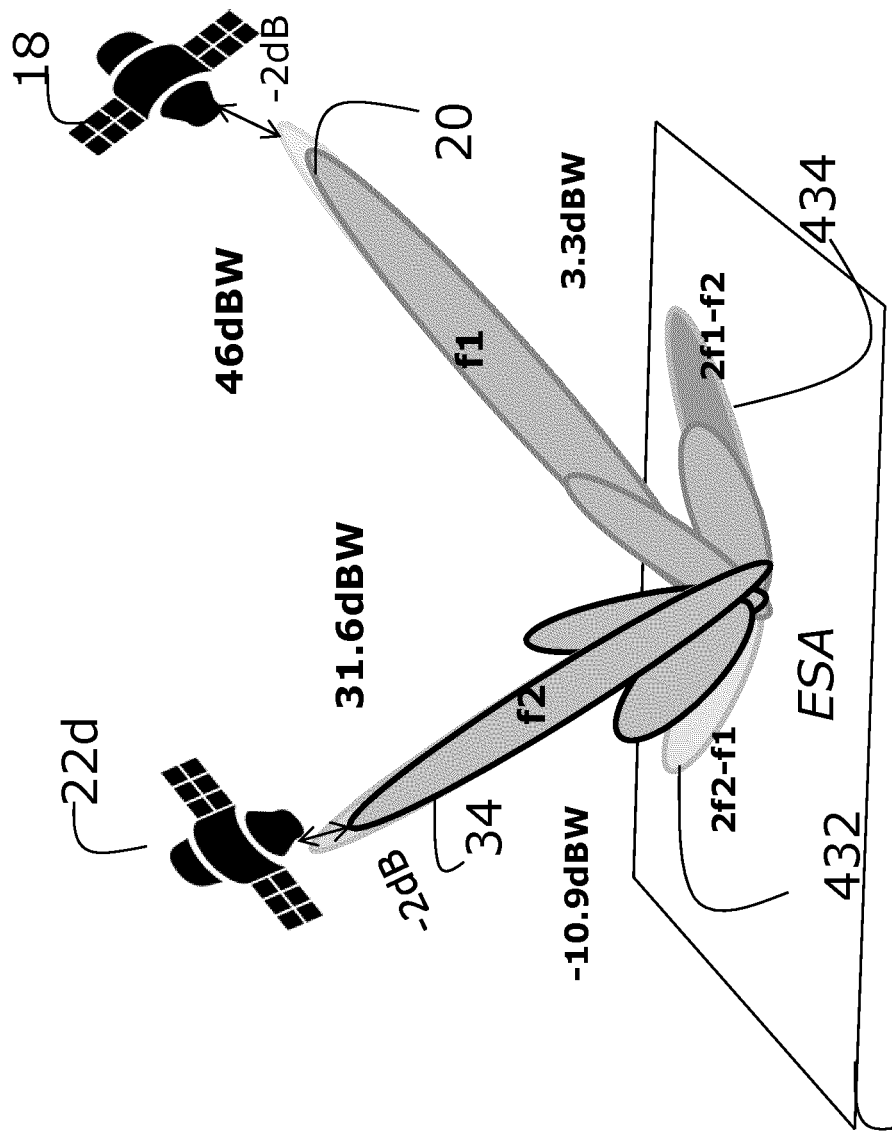
FIG. 10 is a schematic drawing of beams provided by the antenna system illustrated in FIG. 3 at maximum EIRP minus 2 dB according to exemplary aspects of the inventive concepts disclosed herein.
Figure 11:
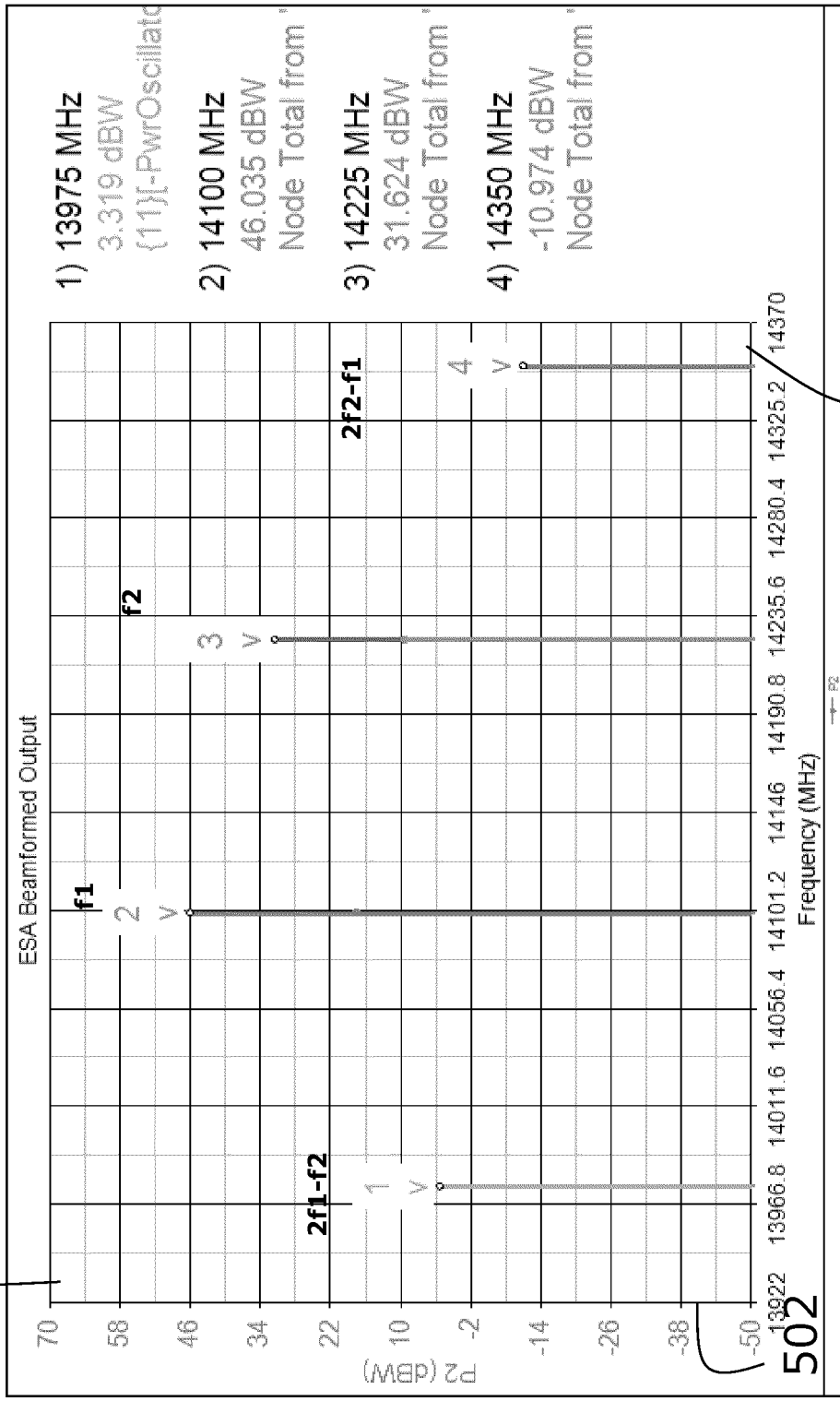
FIG. 11 is a graph showing beamformer output for the beams illustrated in FIG. 10 according to exemplary aspects of the inventive concepts disclosed herein.

With reference to FIG. 10, the provision of the beam 30 at a frequency $f_1$ and the beam 34 at a frequency $f_2$ from the transmit antenna array 202 provides an intermodulation product 432 at a frequency $2f_2-f_1$ and an intermodulation product 434 at a frequency $2f_1-f_2$ for the satellite communication system 38. The frequencies $f_2$ and $f_1$ are equal to 14.225 GHz and 14.101 GHZ, respectively, and are provided at power levels of 31.6 dBW and 45.8 dBW, respectively, in some embodiments. The intermodulation products 432 and 434 have a power level of −10.9 dBW and 3.3 dBW, respectively, in some embodiments. With reference to FIG. 11, a chart 700 includes the Y-axis 502 corresponding to power in dBW and the X-axis 504 corresponding to frequency. The chart 700 shows the power levels associated with the beams 30 and 34 and the intermodulation products 434 and 432 in dBW. At maximum EIRP minus 2 dBW, the intermodulation products 432 and 434 are 42.5 dBW below the power levels associated with the beams 30 and 34, respectively, in some embodiments. The reduction in EIRP is provided by the VGAs 342, 344, 346, and 348 in response to the EIRP control circuit 49 (FIG. 4). Since the close in intermodulation beam products (products 432 and 434) are 3rd order, a 3:1 growth or decay relative to the output power is provided. If the output EIPR drops by 2 dB, the intermodulation products drop by 6 dB in some embodiments.

Figure 12:
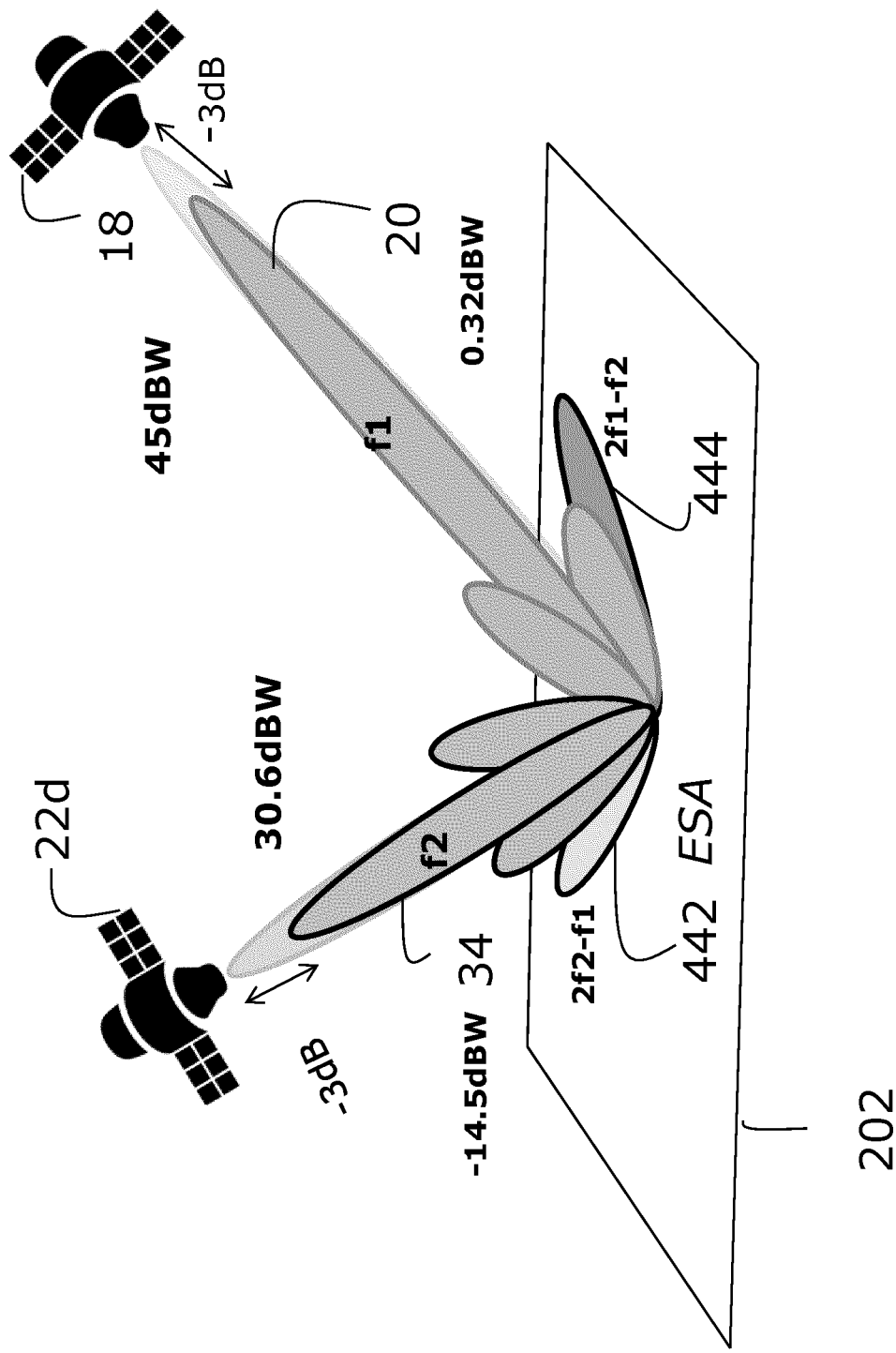
FIG. 12 is a schematic drawing of beams provided by the antenna system illustrated in FIG. 3 at maximum EIRP minus three dB according to exemplary aspects of the inventive concepts disclosed herein.
Figure 13:
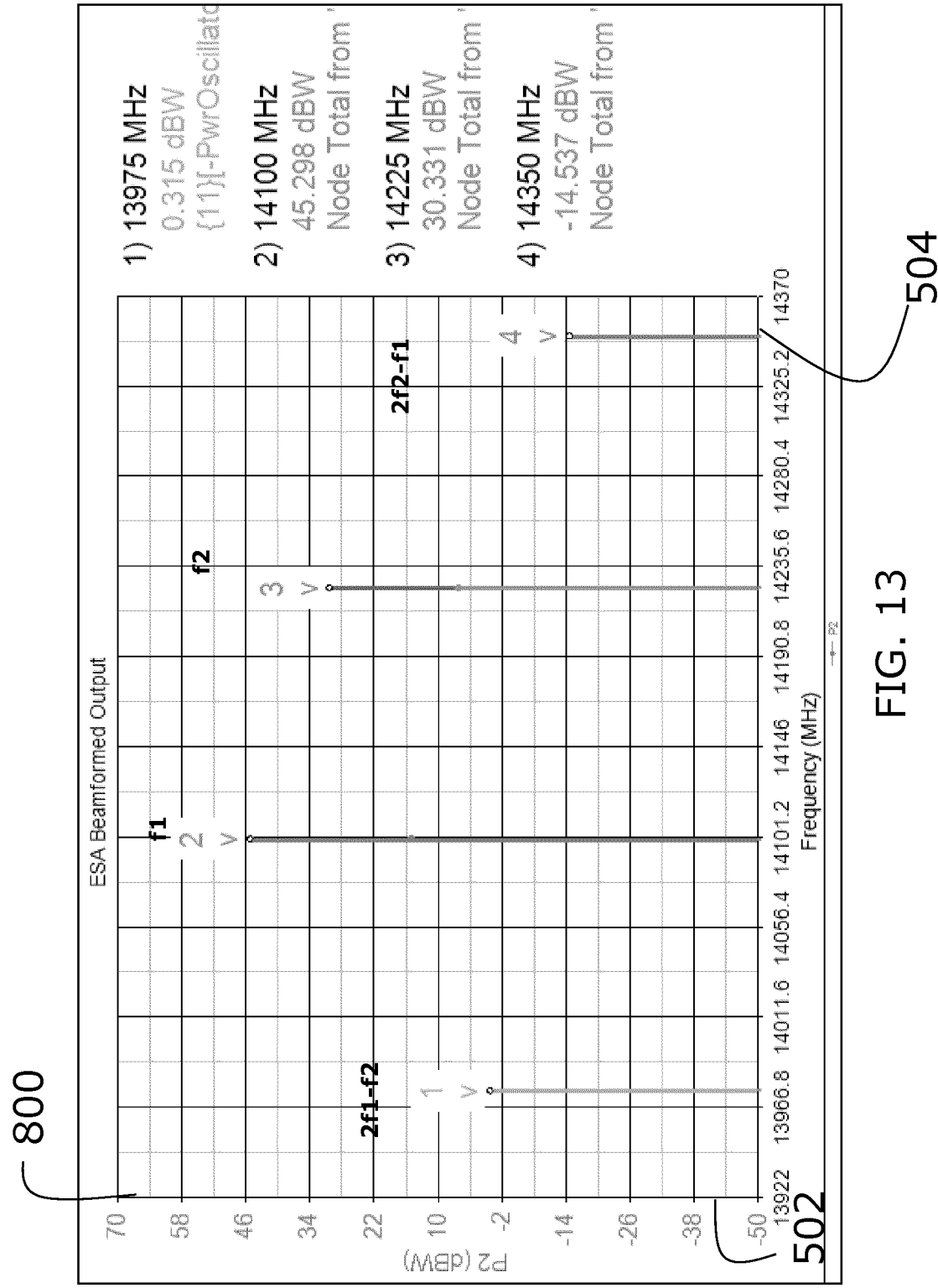
FIG. 13 is a graph showing beamformer output for the beams illustrated in FIG. 13 according to exemplary aspects of the inventive concepts disclosed herein.

With reference to FIG. 12, the provision of the beam 30 at a frequency $f_1$ and the beam 34 at a frequency $f_2$ from the transmit antenna array 202 provides an intermodulation product 442 at a frequency $2f_2-f_1$ and an intermodulation product 444 at a frequency $2f_1-f_2$ for the satellite communication system 38. The frequencies $f_2$ and $f_1$ are equal to 14.225 GHz and 14.101 GHZ, respectively, and are provided at power levels of 30.6 dBW and 45.4 dBW, respectively, in some embodiments. The intermodulation products 442 and 444 have a power level of −14.5 dBW and 0.32 dBW, respectively, in some embodiments. With reference to FIG. 13, a chart 800 includes the Y-axis 502 corresponding to power in dBW and the X-axis 504 corresponding to frequency. The chart 800 shows the power levels associated with the beams 30 and 34 and the intermodulation products 444 and 442 in dBW. At maximum EIRP minus 3 dBW, the intermodulation products 442 and 444 are 45.1 dBW below the power levels associated with the beams 30 and 34, respectively, in some embodiments. The reduction in EIRP is provided by the VGAs 342, 344, 346, and 348 in response to the EIRP control circuit 49 (FIG. 4). Since the close in intermodulation beam products (products 442 and 444) are 3rd order, a 3:1 growth or decay relative to the output power is provided. If the output EIPR drops by 3 dB, the intermodulation products drop by 9 dB in some embodiments.

Figure 14:
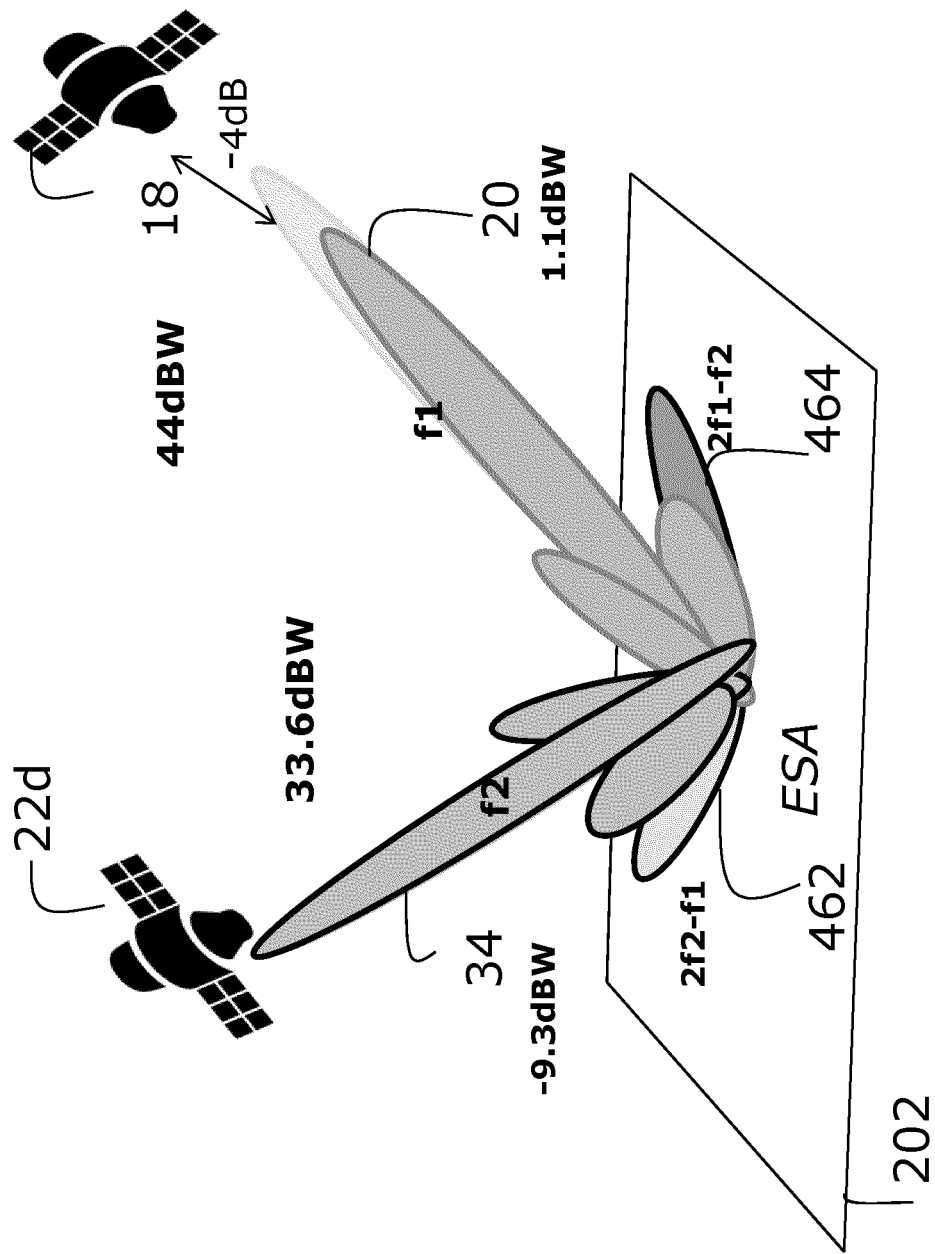
FIG. 14 is a schematic drawing of beams provided by the antenna system illustrated in FIG. 3 at maximum EIRP for a GEO satellite beam and maximum EIRP for a LEO satellite beam minus four db according to exemplary aspects of the inventive concepts disclosed herein.
Figure 15:
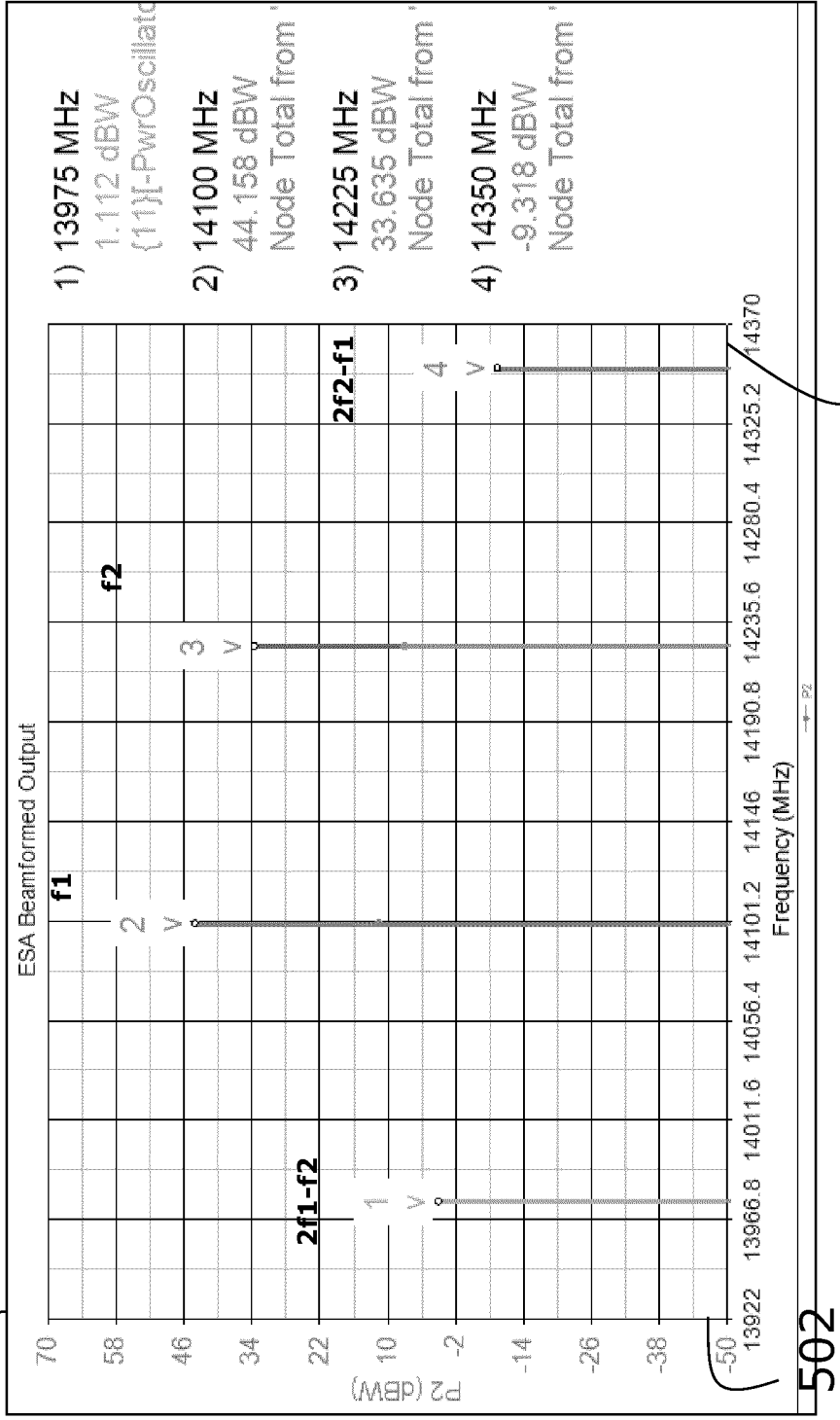
FIG. 15 is a graph showing beamformer output for the beams illustrated in FIG. 14 according to exemplary aspects of the inventive concepts disclosed herein.

With reference to FIG. 14, the provision of the beam 30 at a frequency $f_1$ and the beam 34 at a frequency $f_2$ from the transmit antenna array 202 provides an intermodulation product 462 at a frequency $2f_2-f_1$ and an intermodulation product 464 at a frequency $2f_1-f_2$ for the satellite communication system 38. The frequencies $f_2$ and $f_1$ are equal to 14.225 GHz and 14.101 GHZ, respectively, and are provided at power levels of 30.6 dBW and 45.4 dBW, respectively, in some embodiments. The intermodulation products 462 and 464 have a power level of −14.5 dBW and 0.32 dBW in some embodiments. With reference to FIG. 15, a chart 900 includes the Y-axis 502 corresponding to power in dBW and the X-axis 504 corresponding to frequency. The chart 900 shows the power levels associated with the beams 30 and 34 and the intermodulation products 428 and 426 in dBW. At maximum EIRP minus 4 dBW for the beam 34 and maximum EIRP for the beam 30, the intermodulation products 462 and 464 are 45.1 dBW below the power levels associated with the beams 30 and 34, respectively, in some embodiments. The reduction in EIRP is provided by the VGAs 342, 344, 346, and 348 in response to the EIRP control circuit 49 (FIG. 4). The reductions in EIRP discussed above are exemplary levels only. Other levels of reduction can be utilized.

While the present disclosure describes systems and methods implementable for an aircraft or airborne platform, the inventive concepts disclosed herein may be used in any type of application or environment using satellite communications (e.g., in another aircraft, a spacecraft, an autonomous vehicle, a drone, unmanned aircraft, a ground-based vehicle, a water-based or underwater vehicle, a subsurface or subterranean vehicle, a satellite, an aeronautical platform, or in a non-vehicle application such as a stationary communications, sensing, or testing system, etc.).

The scope of this disclosure should be determined by the claims, their legal equivalents and the fact that it fully encompasses other embodiments, which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A dual beam transmit system for analog beamforming airborne satellite communications, the dual beam transmit system comprising:
    an antenna array comprising a plurality of antenna elements, a first port, a second port, a first variable gain amplifier, and a second variable gain amplifier, the first variable gain amplifier being coupled to the first port, the second variable gain amplifier being coupled to the second port, a first splitter, a second splitter, a first pair of phase shifters, a second pair of phase shifters, a first combiner, a second combiner, a first power amplifier, and a second power amplifier associated with each antenna element, wherein the first variable gain amplifier and the second variable gain amplifier are coupled to the first combiner, the antenna array further comprising a third variable gain amplifier and a fourth variable gain amplifier coupled to the second combiner; and
    a controller configured to adjust gain of the first variable gain amplifier or the second variable gain amplifier to reduce intermodulation in accordance with network management for transmission of a first signal received at the first port and a second signal provided to the second port.

2. The dual beam transmit system of claim 1, wherein each of the antenna elements comprise a first polarization element and a second polarization element, wherein the antenna array is configured to provide a first beam to a first satellite and a second beam to a second satellite.

3. The dual beam transmit system of claim 2, wherein the first beam is associated with the first signal for the first satellite and the second beam is associated with the second signal for the second satellite.

4. The dual beam transmit system of claim 2, wherein the first beam is associated with one or more low earth orbit satellites and the second beam is associated with a geostationary earth orbit satellites.

5. The dual beam transmit system of claim 2, wherein the first beam includes a first polarization component and a second polarization component.

6. The dual beam transmit system of claim 5, wherein the first polarization component is horizontal and the second polarization component is vertical.

7. The dual beam transmit system of claim 1, further comprising:
    a first modem for a first satellite; and
    a second modem for a second satellite.

8. The dual beam transmit system of claim 7, further comprising:
    a first up converter for the first satellite coupled to the first port; and
    a second up converter for the second satellite coupled to the second port.

9. A satellite communication assembly for an aircraft, the satellite communication assembly comprising:
    a transmit antenna array comprising a matrix of antenna elements;

a receive antenna array; and a transmit circuit for the transmit antenna array, the transmit circuit comprising for each of the antenna elements:

a first splitter coupled to receive a first signal for a first type satellite;

a second splitter coupled to receive a second signal for a second type satellite;

a first pair of phase shifters coupled to the first splitter;

a second pair of phase shifters coupled to the second splitter;

a first pair of variable gain amplifiers coupled to the first pair of the phase shifters; and a second pair of variable gain amplifiers coupled to the second pair of the phase shifters;

wherein the transmit circuit further comprises a first pair of power amplifiers, a second pair of power amplifiers, and a first combiner and a second combiner, wherein the first pair of power amplifiers is coupled to the first pair of the variable gain amplifiers, wherein a first power amplifier of the first pair of the power amplifiers is coupled to the first combiner, wherein a second power amplifier of the first pair of the power amplifiers is coupled to the second combiner, wherein the second pair of the power amplifiers is coupled to the second pair of the variable gain amplifiers, wherein a third power amplifier of the second pair of the power amplifiers is coupled to the first combiner, wherein a fourth power amplifier of the second pair of the power amplifiers is coupled to the second combiner.

10. The satellite communication assembly of claim 9, wherein the transmit array is configured to provide a first beamformed signal to the first type satellite and a second beamformed signal to the second type satellite.

11. The satellite communication assembly of claim 10, wherein the first beamformed signal is associated with one or more low earth orbit or medium Earth orbit satellites and the second beamformed signal is associated with one or more geostationary Earth orbit satellites.

12. The satellite communication assembly of claim 10, wherein the first beamformed signal and the second beamformed signal each comprise plurality of polarization components.

\* \* \* \* \*